(12) United States Patent
Arndt et al.

(10) Patent No.: US 11,424,046 B2
(45) Date of Patent: Aug. 23, 2022

(54) ELECTRONIC ENCLOSURE WITH NEUTRON SHIELD FOR NUCLEAR IN-CORE APPLICATIONS

(71) Applicant: WESTINGHOUSE ELECTRIC COMPANY, LLC, Cranberry Township, PA (US)

(72) Inventors: Jeffrey L. Arndt, Pittsburgh, PA (US); Jorge V. Carvajal, Irwin, PA (US); Shawn C. Stafford, Scottdale, PA (US); Melissa M. Heagy, Butler, PA (US); John R. Abel, II, Allison Park, PA (US); Robert W. Flammang, Pittsburgh, PA (US); Michael R. Ickes, Pittsburgh, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 322 days.

(21) Appl. No.: 16/210,407

(22) Filed: Dec. 5, 2018

(65) Prior Publication Data

US 2020/0185116 A1 Jun. 11, 2020

(51) Int. Cl.
*G21F 3/00* (2006.01)
*G21F 1/00* (2006.01)
(Continued)

(52) U.S. Cl.
CPC ............... *G21F 3/00* (2013.01); *G21F 1/00* (2013.01); *G21F 1/08* (2013.01); *G21F 1/12* (2013.01);
(Continued)

(58) Field of Classification Search
CPC ..... G21F 3/00; G21F 1/00; G21F 1/08; G21F 1/12; G21F 1/125; G21C 3/18; G21C 3/20; G21C 17/102
(Continued)

(56) References Cited

U.S. PATENT DOCUMENTS

| 2011/0024613 A1* | 2/2011 | Roberts | G01T 3/00 250/256 |
| 2012/0281803 A1* | 11/2012 | Reichwein | G21C 11/00 376/288 |

(Continued)

FOREIGN PATENT DOCUMENTS

| EP | 2355108 A1 | 8/2011 |
| JP | 2004212372 A | 7/2004 |

(Continued)

OTHER PUBLICATIONS

International Search Report and Written Opinion for International PCT Application No. PCT/US2019/059959, dated May 7, 2020.
(Continued)

*Primary Examiner* — Nicole M Ippolito
(74) *Attorney, Agent, or Firm* — K&L Gates LLP

(57) ABSTRACT

An enclosure for non-organic electronic components is provided which includes an inner cavity for housing non-organic electronic components and a neutron shielding barrier surrounding the inner cavity and the electronic components housed within the cavity. The barrier is formed from a neutron reflecting material in solid or powdered form and a neutron absorbing material in solid or powdered form. An optional structural support is provided in certain aspects of the enclosure design.

11 Claims, 4 Drawing Sheets

(51) Int. Cl.
     *G21F 1/08*       (2006.01)
     *G21F 1/12*       (2006.01)
     *G21C 17/10*      (2006.01)
     *G21C 3/18*       (2006.01)
     *G21C 3/20*       (2006.01)

(52) U.S. Cl.
     CPC .............. *G21F 1/125* (2013.01); *G21C 3/18* (2013.01); *G21C 3/20* (2013.01); *G21C 17/102* (2013.01)

(58) Field of Classification Search
     USPC ......... 250/505.1, 506.1, 515.1, 516.1, 517.1, 250/518.1, 519.1
     See application file for complete search history.

(56) References Cited

U.S. PATENT DOCUMENTS

| | | | |
|---|---|---|---|
| 2015/0198544 A1* | 7/2015 | Alzaidi | G01N 23/204 250/370.12 |
| 2017/0090049 A1* | 3/2017 | Ramsden | G01T 3/06 |
| 2017/0352442 A1 | 12/2017 | Lorenzo et al. | |

FOREIGN PATENT DOCUMENTS

| | | |
|---|---|---|
| JP | 201180886 A | 4/2011 |
| WO | 2020117415 A1 | 6/2020 |

OTHER PUBLICATIONS

International Preliminary Report on Patentability for International PCT Application No. PCT/US2019/059959, dated Jun. 17, 2021.

\* cited by examiner

ELECTRONIC ENCLOSURE WITH NEUTRON SHIELD FOR NUCLEAR IN-CORE APPLICATIONS

BACKGROUND OF THE INVENTION

1. Field of the Invention

The invention relates to enclosures for use in nuclear fuel rods to shield in-core electronic components.

2. Description of the Prior Art

Sensors are placed in and around nuclear reactors to monitor conditions within the reactor. Tests have shown that some electronic sensors, such as non-organic capacitors, inductors, and surge arrestor gas discharge tubes, will operate at conditions equivalent to the elevated temperatures and radiation environments found in pressurized water reactors (PWR), but that the long term stability and drift of their operating parameters degrade over time. For example, a capacitor's capacitance, an inductor's inductance, or a gas discharge tube's break down voltage will degrade under the conditions present in nuclear reactors.

The sensors placed in reactors are exposed to ionizing radiation from both neutrons and gamma radiation. Over time, the radiation will interact with the materials in the electronic components of the sensors to impact performance and in many cases cause damage to the sensors. The effects of gamma radiation, however, have been found to be predominantly transient in nature or only present when the irradiation field is present and cumulative damage to the microstructure is minimal. The effect of neutron exposure produces damage cascades of permanent voids and interstitials within the material and in some cases cause transmutation reactions to occur. The effects of the neutrons on the material used in sensors are both permanent and cumulative, whereas the effects of gamma irradiation are predominantly short lived and non-cumulative.

There is a need, therefore, to protect electronic components in sensors used in nuclear reactors from the effects of neutron exposure.

SUMMARY OF THE INVENTION

The following summary is provided to facilitate an understanding of some of the innovative features unique to the embodiments disclosed and is not intended to be a full description. A full appreciation of the various aspects of the embodiments can be gained by taking the entire specification, claims, and abstract as a whole.

The damaging effects of neutron exposure described above can be significantly delayed or reduced, if not avoided entirely, by enclosing the non-organic components of sensors necessary to the operation and monitoring of a nuclear reactor within an electronic enclosure equipped with a neutron shield as described herein. Having such a neutron shield will stabilize the performance of the sensors and slow down the long term degradation of the components due to neutron interactions. For optimum function, in various aspects, the enclosure would reside within the inner diameter of a typical nuclear fuel rod. In various aspects, the enclosure would be able to withstand neutron flux levels typically seen in the core of a commercial PWR reactor. In various aspects, the enclosure should withstand temperatures greater than 350° C.

An electronics enclosure having neutron shielding properties according to any of the embodiments described herein will enable real time data recovery during testing of new fuel and cladding designs and in actual operation of nuclear reactors. In various aspects, the electronics enclosure with neutron shielding properties described herein may isolate the electronic components from electrically conductive fuel rods. In various aspects, the electronics enclosure with neutron shielding properties described herein may provide the opportunity to shield non-organic electronics from neutrons and extend the time required to reach a target fluence.

An enclosure for non-organic electronic components according to various aspects includes a supporting structure that defines an inner cavity for housing non-organic electronic components, and a neutron barrier formed from neutron reflecting materials and neutron absorbing materials. The neutron barrier shields the electronic components when the components are housed in the cavity from neutrons, such as those generated in a nuclear reactor core.

The neutron barrier may comprise a solid neutron reflecting layer surrounding the neutron absorbing material, and in certain aspects, the solid neutron reflecting layer may be the supporting structure. The neutron absorbing material may be in the form of a solid inner layer adjacent to and surrounding the cavity, being positioned in between the solid neutron reflecting layer and the cavity. Alternatively, the neutron absorbing material may be in the form of a powder filling the cavity and, in use, surrounding the electronic components.

In certain aspects, the supporting structure may be an outer structural layer made of a neutron transparent material, such as a solid ceramic material that neither reflects nor absorbs neutrons.

In various aspects, the supporting structure may surround a solid neutron reflecting layer, which in turn may surround either a solid neutron absorbing material that surrounds the cavity, or a powdered neutron absorbing material within the cavity.

In alternative aspects, the supporting structure may surround the cavity and the neutron barrier may be comprised of neutron reflecting material and neutron absorbing material in the form of powders contained within the cavity. The neutron reflecting and neutron absorbing powders may form a mixture filling the cavity and, in use, surrounding the electronic components. In certain aspects, the neutron reflecting powder and the neutron absorbing powder may be disposed in layers, wherein the neutron absorbing powder layer is disposed adjacent to and surrounding the cavity and the neutron reflecting powder layer is disposed between the solid ceramic supporting structure and the neutron absorbing powder layer.

In certain aspects, the neutron reflecting powder and the neutron absorbing powder may be disposed in multiple alternating layers within the cavity.

In certain aspects, the neutron reflecting powder may be disposed in a layer in the cavity adjacent to the solid ceramic layer and the neutron absorbing powder may fill the cavity and in use, surround the electronic components.

An embodiment of the enclosure described herein may be for use in a nuclear fuel rod wherein the fuel rod has a section for containing nuclear fuel. The enclosure includes an outer structural layer defining an inner cavity for receiving, in use, non-organic electronic components, a neutron barrier disposed between the structural layer and the cavity, the neutron barrier comprising at least one neutron reflecting layer and at least one neutron absorbing layer, and a forward neutron absorbing layer positioned between the section for containing nuclear fuel and the cavity.

BRIEF DESCRIPTION OF THE DRAWINGS

The characteristics and advantages of the present disclosure may be better understood by reference to the accompanying figures.

FIG. 1 B shows a section view along the line A-A of the embodiment of the electronic enclosure shown in FIG. 1 A.

FIG. 1 C shows a section view along the line B-B of the embodiment of the electronic enclosure shown in FIG. 1 A.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Sensitive electronic components needed in nuclear fuel assemblies may be protected from exposure to neutrons by enclosing the components in an electronics enclosure 10 equipped with a neutron barrier 20 according to the various embodiments described herein.

Figure 1A:
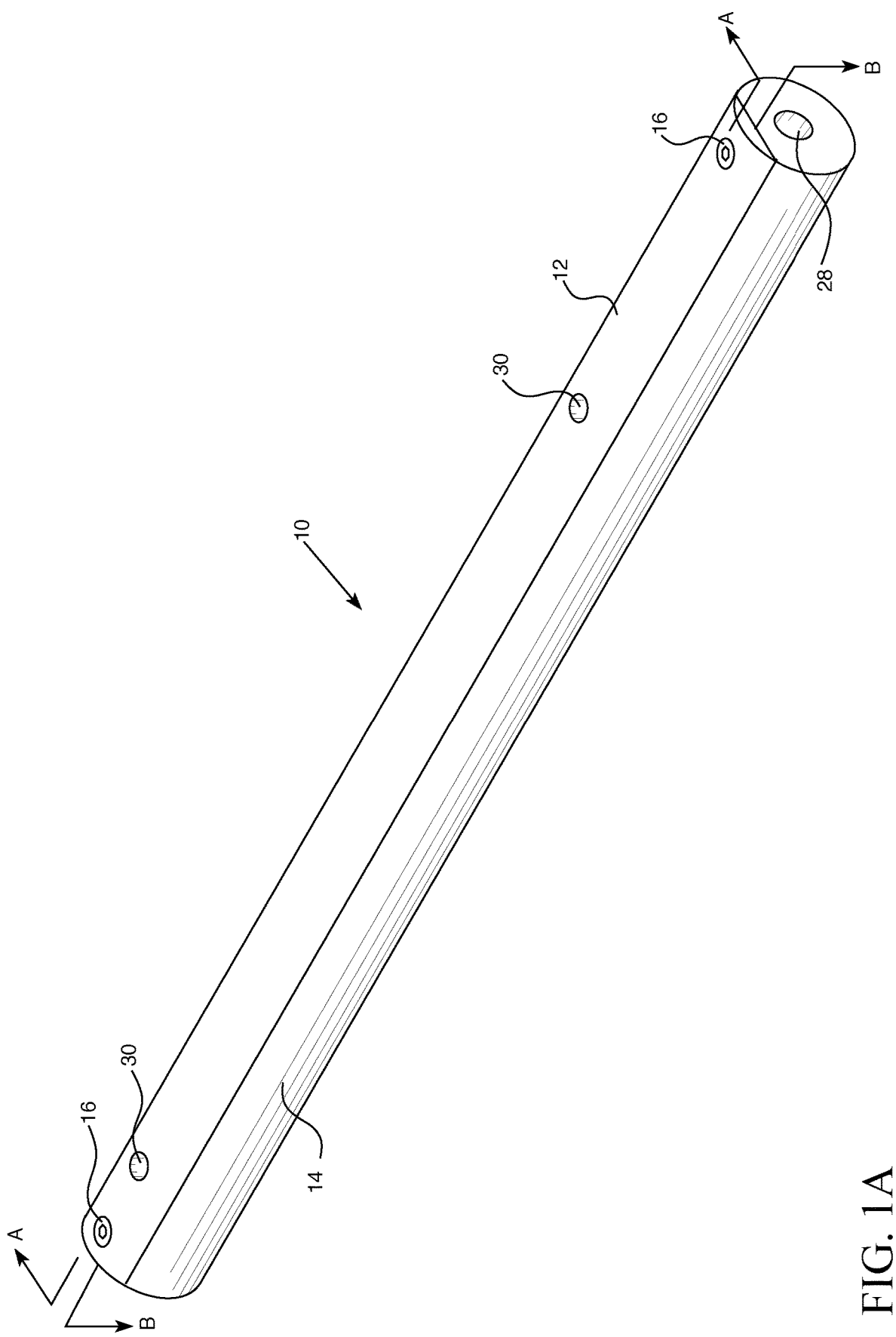
FIG. 1 A shows an embodiment of a form of the electronic enclosure described herein.
Figure 1B:
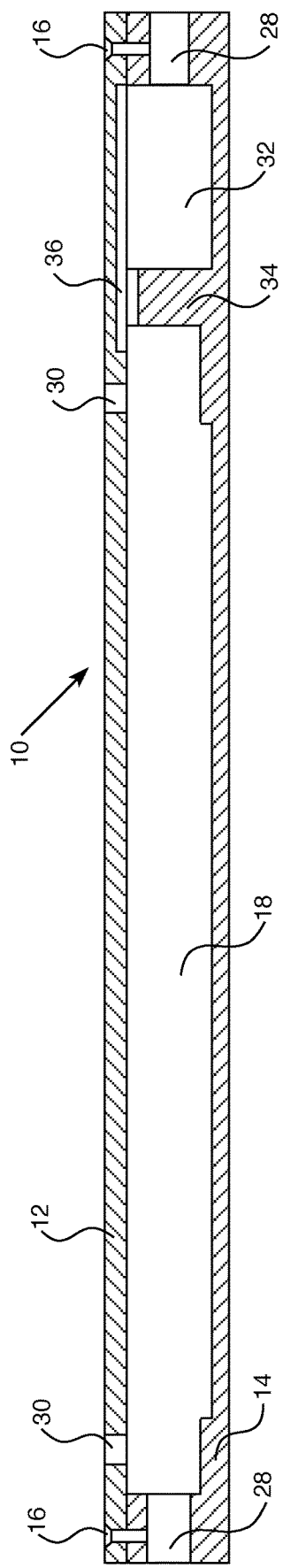
Figure 1C:
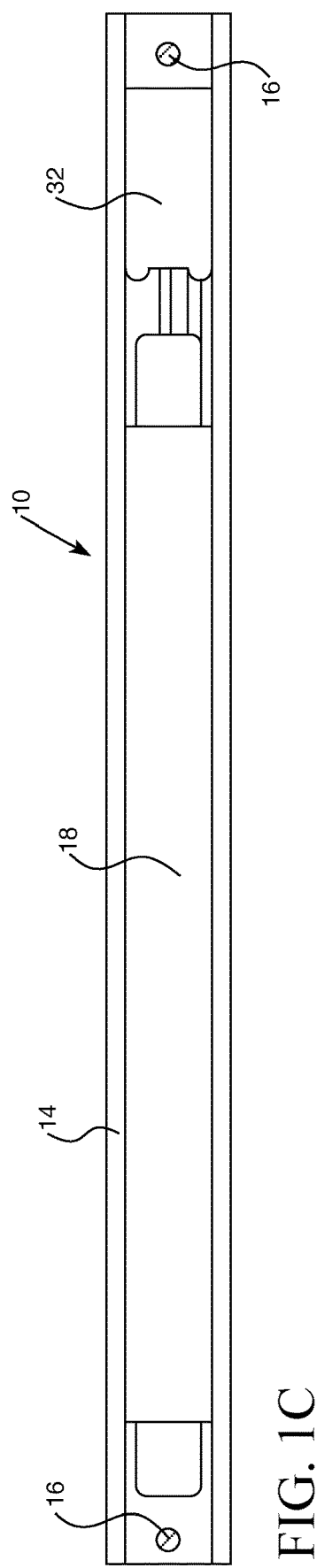

Referring to FIGS. 1 A-C, an embodiment of the electronics enclosure 10 includes an enclosure body 14 and a lid 12. An internal cavity 18 houses non-organic sensors and other electronic components (not shown) critical for various instrumentation and measurement applications. The sensors may include, for example, transmitters, capacitors, and detectors for measuring environmental conditions, such as in-core radioactivity sensors, thermocouple sensors, temperature sensors, pressure sensors and the like. The cavity 18 may be made into any shape best suited to house the particular non-organic components to be placed in the enclosure 10.

In certain aspects, the cavity 18, as shown in FIG. 1 A-C, may include one or more separate compartments 32 of a different size to accommodate different components. The compartments 32 may be separated from cavity 18 by a wall 34 or may be continuous. Cavity 18 also includes passages 28 and 36 through which wires for the electronic components may pass out of and through the enclosure 10, respectively. Lid 12 may include threaded holes 30 leading into cavity 18 for placement of screws (not shown) to hold the electronics in place within the cavity 18 to prevent movement or shifting of the electronic components. In use, in certain aspects, after the sensor or other electronic components have been inserted in the cavity 18, lid 12 is attached to body 14 with screws or other fasteners 16. Alternatively, cavity 18 may be one single cavity of uniform or non-uniform dimensions.

Figure 5:
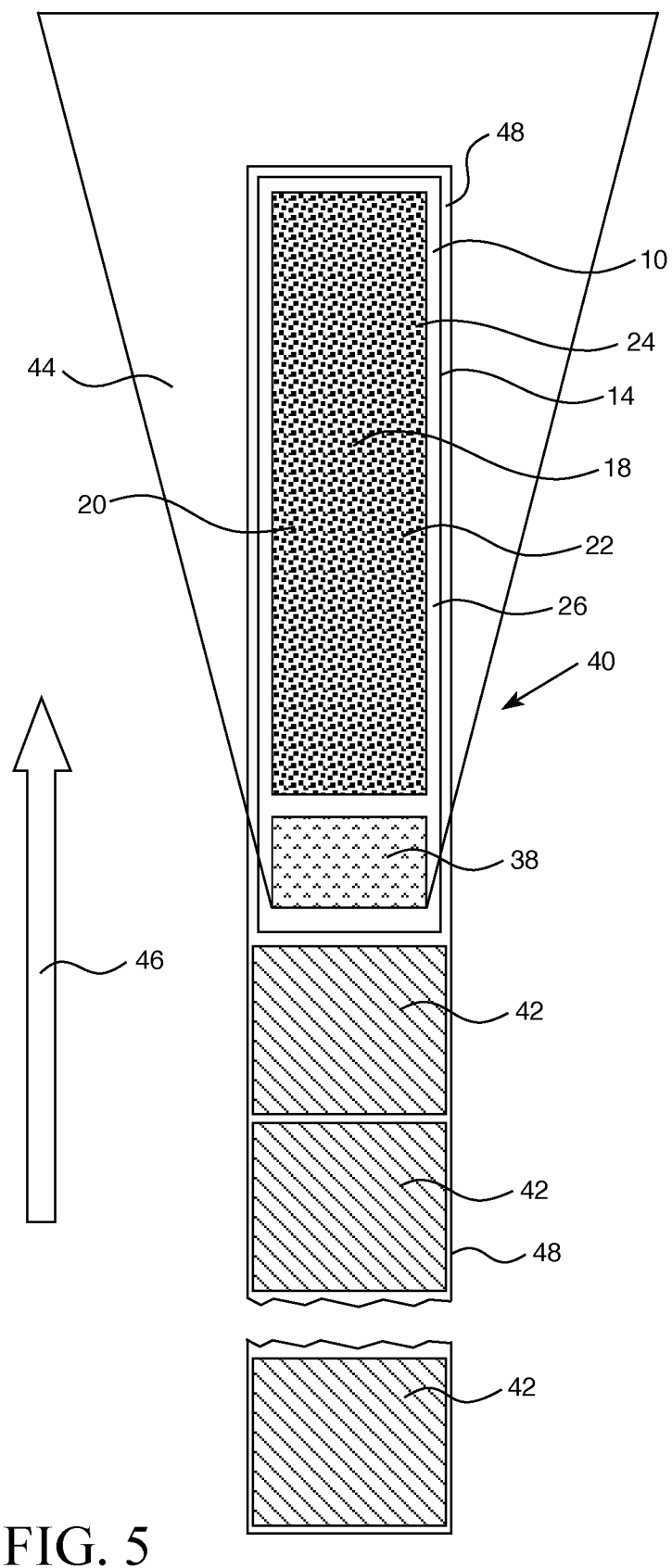
FIG. 5 is a schematic cross-sectional illustration of a nuclear fuel rod having an embodiment of an electronics enclosure positioned within the fuel rod, above fuel pellets wherein the electronics enclosure includes a first neutron barrier in the form of powdered reflective and absorbing barrier materials filling those spaces in the cavity that are not occupied by electronic components (not shown) and a second neutron barrier positioned between the electronics cavity and the stack of fuel pellets.

In various aspects, enclosure 10 is made of a ceramic based material. The enclosure 10 is designed to fit within the inner diameter of a nuclear fuel rod 40 and preferably positioned axially near the top of the fuel rod 40 in the upper plenum region, as shown in FIG. 5.

The electronic enclosure 10 also includes a neutron barrier 20 surrounding the electronic components. Neutron barrier 20 includes a neutron reflecting material and a neutron absorbing material.

When a neutron interacts with the electronic enclosure 10, the neutron reflecting material 22 will act as the first layer of the neutron barrier 20 to shield the electronic components from neutrons. Beryllium Oxide (BeO), for example, is suitable as the neutron reflecting material because it has very low thermal and fast nuclear absorption cross sections but a relatively high scattering cross section. When neutrons interact with BeO the majority will scatter elastically away from the sensitive electronics. Many neutrons will be reflected back into the moderator. A moderator, as used herein, means the material that surrounds the fuel rod and thermalizes, or slows down, the neutrons. In a pressurized water reactor, for example, the moderator is water. The neutron absorbing material 24 provides the second layer of the neutron barrier 20 to shield the electronic components from neutrons. Gadolinium (Gd) containing materials are examples of suitable neutron absorbing materials. Gadolinium in the form of gadolinium oxide or gadolinium isotopes Gd-155 and Gd-157 have the highest neutron capture rate of any stable isotope with thermal absorption cross-sections of 61,000 and 254,000 barns respectively. These materials will be very effective at absorbing thermal neutrons and protecting the sensitive electronics.

It is important to note that BeO and $Gd_2O_3$ are not required for the neutron reflecting and neutron absorbing materials and are listed as examples only. There are other commercially available ceramics with highly reflective and absorptive properties. Examples of neutron reflecting materials useful in the neutron barrier 20 include beryllium, beryllium oxides, beryllium nitrides or beryllium carbides. Examples of neutron absorbing materials include gadolinium metals, gadolinium oxides, gadolinium isotopes, ceramic compounds of gadolinium, cadmium metals, cadmium oxides, born metals, boron oxides, hafnium metals, hafnium oxides, etc. The materials are most preferably made of the ceramic forms of the base materials to ensure high temperature operation and also to act as an electrical insulation barrier for the conductive electronics.

As the reflecting and absorbing layers 22, 24 of neutron barrier 20 are irradiated with neutrons over time, the mechanical properties and structure will degrade. The use of a support structure 26, in certain embodiments as the primary structural support or in certain embodiments as an additional structural support, provides structure for enclosure 10 in the event degradation weakens the neutron barrier 20. The structural support 26 may be made of a neutron transparent material that is neither a neutron reflecting nor a neutron absorbing material. In various aspects, the neutron transparent material may be a ceramic material, and may preferably be made of alumina ($Al_2O_3$).

Various configurations of neutron barrier 20 may satisfy the neutron shielding function to protect the electronic components in cavity 18. In one aspect, the enclosure body 14 may be formed from a structural support 26 and one or more neutron barrier layers. In this embodiment, the neutron barrier 20 may be formed from a solid neutron reflective layer 22 that surrounds a solid neutron absorbing layer 24. Both surround cavity 18.

Figure 2:
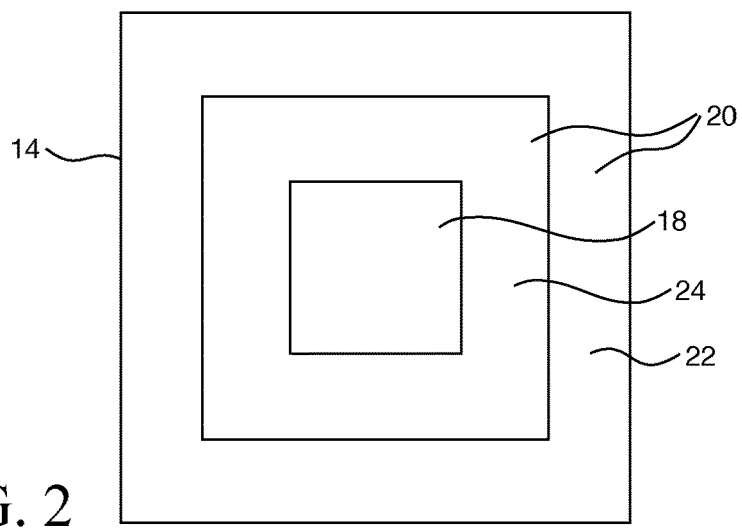
FIG. 2 is a schematic illustration of an embodiment of the electronics enclosure showing a neutron barrier functioning as the support structure with a solid neutron reflective layer and a solid neutron absorbing layer surrounding the electronics cavity.

In one aspect, neutron reflective layer 22, alone or with neutron absorbing layer 24, may provide the structural support and an additional or separate support structure 26 may be eliminated. FIG. 2 illustrates a configuration for the neutron barrier 20 wherein the neutron reflecting layer 22 and the neutron absorbing layer 24 act both as the structural support and the neutron shield for the electronic enclosure 10. The solid neutron reflective layer 22 may alone function as the structural support to give enclosure body 14 its solid structure. In this embodiment, enclosure body 14 comprises the solid neutron reflective layer 22 surrounding the solid neutron absorbing layer 24. In various aspects, the neutron reflecting layer may be made of beryllium or a beryllium containing compound, such as beryllium oxide (BeO). In various aspects, the neutron absorbing layer may be made of gadolinium or a gadolinium containing compound, such as gadolinium oxide ($Gd_2O_3$).

Figure 3:
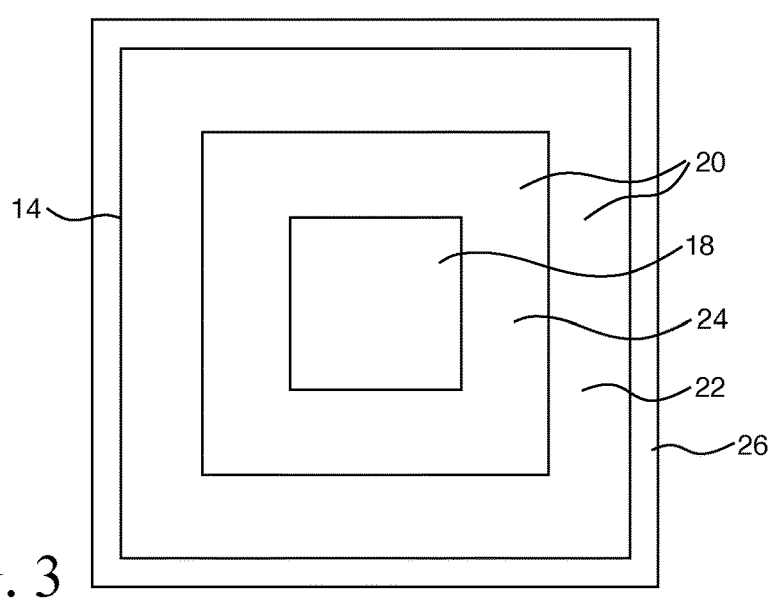
FIG. 3 is a schematic illustration of a distinct solid support structure surrounding the solid neutron reflective and absorbing barrier layers of FIG. 2.

FIG. 3 schematically illustrates an alternative embodiment of enclosure 10 wherein the outermost layer is a structural support 26, made of a neutron transparent material, such as a ceramic material. The ceramic material used for support structure 26 may be alumina. The use of alumina is well understood in nuclear applications and will provide either primary structural support or additional structural support for enclosure 10. In the embodiment shown in FIG. 3, the structural support 26 surrounds a solid neutron reflective layer 22 which in turn surrounds a solid neutron absorbing layer 24, which surrounds cavity 18.

Figure 4:
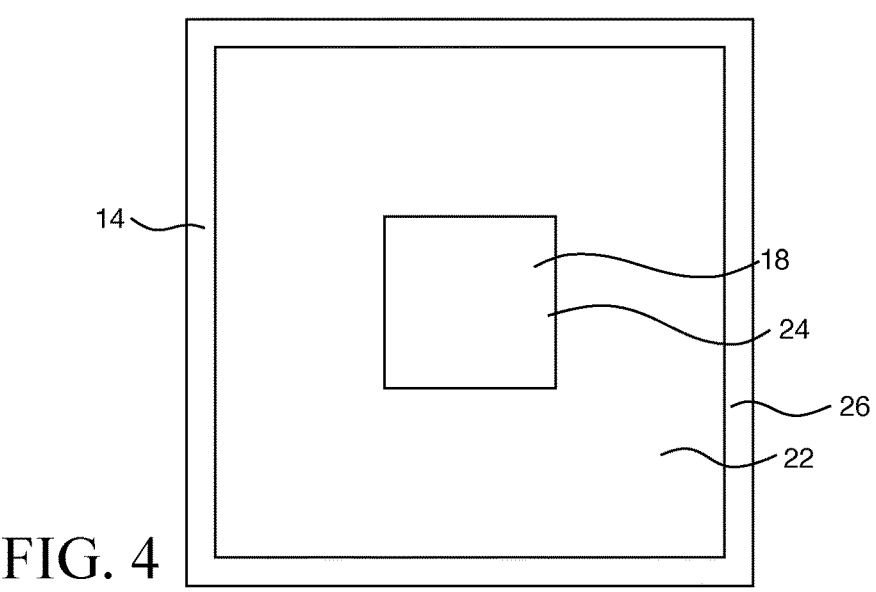
FIG. 4 is a schematic illustration of an embodiment of the electronics enclosure showing a solid support structure formed from a neutron transparent material surrounding a neutron barrier having a solid reflecting barrier surrounding an electronics cavity filled with a neutron absorbing material in powdered form to fill those spaces in the cavity that are not occupied by electronic components (not shown).

In various aspects, the neutron absorbing material 24 may be in the form of a powder which fills the spaces in cavity 18 that remain after the electronics components are inserted into the cavity 18. A neutron absorbing material 24 in powdered form is packed into cavity 18 and any other cavities 32 or passages 28 and 36 to fill any voids not filled by the electronics. For example, FIG. 4 schematically illustrates a configuration of enclosure 10 having, for example, an alumina ($Al_2O_3$) ceramic structural support 26 surrounding a solid neutron reflecting layer 22 which surrounds a cavity 18 filled with a neutron absorbing material 24 in powder form. Alternatively, the powdered neutron absorbing material 24 may be in the form of pressed powdered layer lining the interior of cavity 18 surrounding the electronic components.

In another embodiment of the neutron barrier 20, the reflecting and absorbing layers may both be in powdered form surrounded by a non-reflecting, non-absorbing structural support 26. For example, both BeO and $Gd_2O_3$ are available in powder form. The powders may be in the form of a homogenous mixture or may be in the form of pressed powdered layers, with alternating layers of at least one layer of each of the neutron reflecting and absorbing materials 22, 24. FIG. 5 illustrates one configuration of enclosure 10 wherein neutron barrier 20 is in powdered form packed around the sensitive electronics (not shown).

In another embodiment, a solid reflecting layer 22 comprising a first part of neutron barrier 20 may act as the support structure 26 and surround cavity 18. The neutron absorbing material comprising a second part of the neutron barrier 20 may be in the form of a powder packed around the electronic components and filling spaces in cavity 18 not occupied by the electronic components, such as the wire passages 36 and 28. Alternatively, the powdered neutron absorbing material 24 may be in the form of pressed powdered layer lining the interior of cavity 18 surrounding the electronic components.

In an embodiment shown in FIG. 5, there may be at least two neutron absorbing layers in different positions within enclosure 10. An initial or forward neutron absorbing layer 38 is shown. The forward neutron absorbing layer 38 may provide an initial shield against neutrons coming from the nuclear fuel rod 40. For example, the forward neutron absorbing layer 38 may be placed below the electronics cavity 18 between the center of the reactor core and the sensitive electronics. It is understood that neutrons in the plenum region of a nuclear fuel rod 40 will come from all directions but will have an upward bias, in the direction shown by arrow 46. In this embodiment, enclosure 10 shields the electronics from neutrons that come from the center of the core that have this upward bias. The placement of the forward neutron absorbing layer 38 in the path of the neutron flow will cast a "neutron shadow" 44 over the electronics as illustrated in FIG. 5, absorbing neutrons that might otherwise have been directed toward the area of the shadow 44. The forward neutron absorbing layer 38 may be a block of a solid material, such as a gadolinium containing material or any of the neutron absorbing materials discussed above. As stated above, gadolinium oxide is only one of several materials that may be used in the neutron barrier 20. Gd metal (or another material with a high neutron cross section) may be used as the forward neutron absorbing layer 38.

A benefit from forward neutron absorbing layer 38 is that it can be made thicker than the absorbing layer forming part of the enclosure 10 or packed in the cavity 18. The thicker layer 38 will therefore be able to absorb more neutrons.

In this arrangement, the neutron barrier 20 can be made from electrically conductive metal, such as cadmium, boron, hafnium, and gadolinium, without shorting any of the electronics because it can be separated from the components.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. An enclosure for non-organic electronic components, the enclosure comprising:

a supporting structure defining an inner cavity for housing non-organic electronic components, wherein the electronic components are located within a nuclear reactor core; and a neutron barrier formed from neutron reflecting materials and neutron absorbing materials for shielding electronic components housed in the cavity from neutrons, wherein the neutron barrier fully surround the electronic components.

2. The enclosure recited in claim 1 wherein the supporting structure is a solid neutron transparent material; and, the neutron reflecting material and the neutron absorbing material comprise powders contained within the inner cavity.

3. The enclosure recited in claim 2 wherein the neutron reflecting and neutron absorbing powders form a mixture filling the cavity and, in use, surrounding the electronic components.

4. The enclosure recited in claim 2 wherein the neutron reflecting powder and the neutron absorbing powder are disposed in layers, the neutron absorbing powder layer disposed adjacent to and surrounding the cavity and the neutron reflecting powder layer disposed between the supporting structure and the neutron absorbing powder layer.

5. The enclosure recited in claim 2 wherein the neutron reflecting powder and the neutron absorbing powder are disposed in multiple alternating layers.

6. The enclosure recited in claim 2 wherein the neutron reflecting powder is disposed in a layer adjacent to the solid neutron transparent layer and the neutron absorbing powder fills the cavity and in use, surrounds the electronic components.

7. The enclosure recited in claim 1 wherein the neutron reflecting material comprises beryllium or a beryllium containing ceramic compound.

8. The enclosure recited in claim 1 wherein the neutron reflecting material comprises gadolinium or a gadolinium containing ceramic compound.

9. The enclosure recited in claim 1 wherein the neutron reflecting material is selected from the group of gadolinium, cadmium, boron, hafnium, ceramic compounds containing of one or more of gadolinium, cadmium, boron, and hafnium, metal compounds containing gadolinium, and combinations thereof.

10. The enclosure recited in claim 1 wherein the enclosure has a bottom end and an upper end and further comprising a block of the neutron absorbing material positioned between the bottom end and the cavity.

11. The enclosure recited in claim 1 wherein the supporting structure is a solid ceramic layer.

* * * * *